Aug. 14, 1962    T. E. NANCE    3,049,374
PASSENGER SEAT INSTALLED FOOD CONTAINER
Filed June 13, 1960    2 Sheets-Sheet 1

TOMMY E. NANCE
INVENTOR.

BY
M. Drewry Edwards
ATTORNEYS

Aug. 14, 1962 T. E. NANCE 3,049,374
PASSENGER SEAT INSTALLED FOOD CONTAINER
Filed June 13, 1960 2 Sheets-Sheet 2
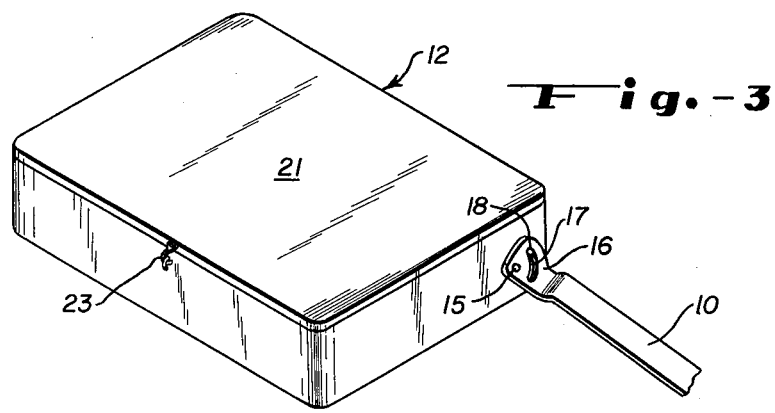
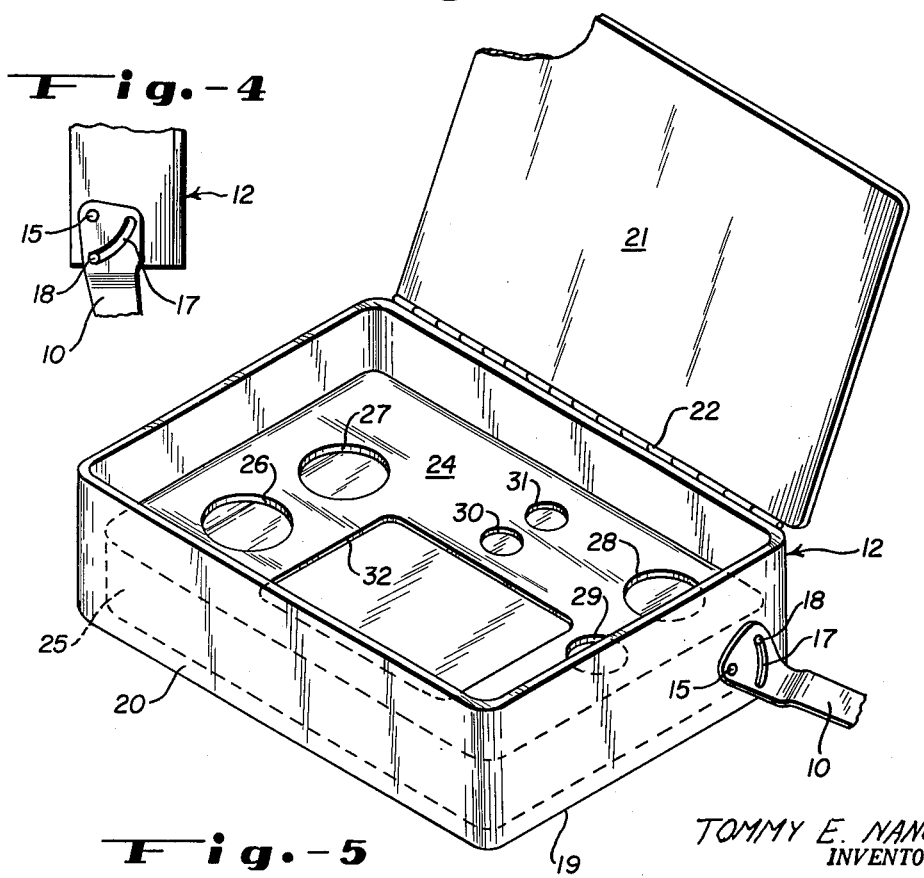
TOMMY E. NANCE
INVENTOR.
BY
ATTORNEYS // # 3,049,374
PASSENGER SEAT INSTALLED FOOD CONTAINER
Tommy E. Nance, Denver, Colo., assignor to Continental Air Lines, Inc., Denver, Colo., a corporation of Nevada
Filed June 13, 1960, Ser. No. 35,594
1 Claim. (Cl. 297—146)

This invention relates to attachments for passenger seats, and more particularly to passenger seat attached multiple purpose containers for the storage of food or the like, for use as individual service trays, etc.

The long distance transportation of passengers by almost any type of conveyance generally has included a first class or luxury type service. Air transportation has traditionally provided a luxury or first class service which calls for the service of meals for the passengers aloft during mealtimes. During other times snacks may be served. Service of such meals has been attended to by air hostesses who carry individual trays from a service compartment to passengers in their individual seats. In some instances, the individual seat is provided with a tray which attaches to the seat and in other instances, the tray is merely placed on a pillow in the passenger's lap. As the first passengers served finish their meal, the hostesses remove the trays with the empty dishes.

As aircraft have been made larger, carrying a greater number of passengers, the service of food has become more and more of a problem. With the advent of high speed air transportation, that is jet powered airlines, the actual air time en route from point to point has been greatly reduced, further increasing the problem of providing adequate service for the passengers. As the time of the flights is reduced and the number of passengers gets greater, service of food to the passengers by hostesses along conventional methods becomes virtually impossible.

According to the present invention, we have provided a seat attached container which is arranged to hold a meal or snacks for an individual passenger, which container folds out of the way, but is readily extended to proper service position for the passenger at the passenger's convenience. The container provides a tray for the storage and service of food, and in closed position, provides a table for the convenience of the passenger for writing, card playing and the like. The container of the invention is arranged to be attached to the seat ahead of the passenger for whom the tray is intended, and the container is arranged to extend to a particular usable position for the passenger regardless of the position of the back of the seat in front of the passenger. In this manner, the position of the seat in front of the passenger does not hinder the passenger's use and enjoyment of the tray.

Included among the objects and advantages of the invention is a container for food and the like arranged to be pivotally fastened to a vehicle passenger seat and is movable from a position for use by a passenger to a stored position in the back of the seat in front of such passenger. The invention, further, provides for a container and desk combination which is arranged to be extended to a usable position for a passenger regardless of the position of the seat to which such container is attached, and provides an effective and efficient individual storage container for food and/or dirty dishes for the individual passenger's personal convenience. The containers of the invention provide an efficient and effective method for preparing a passenger vehicle for a trip which includes pre-positioning prepared meals in the passenger's individual containers, and by moving the containers to the stored position in the seat back and front of individual passengers, provide meal service for passengers at their individual preference and convenience, and provide a simplified and effective means of removing dirty dishes at the discretion of the individual passenger.

These and other objects and advantages of the invention may be readily ascertained by referring to the following description and appended illustrations in which:

FIG. 3 is a partial schematic view of a container according to the invention in extended passenger usable position;

FIG. 4 is an enlarged detail of the container hinge arrangement; and

FIG. 5 is a perspective view of a container according to the invention in open position showing a food holding insert for use with the container.

Figure 1:
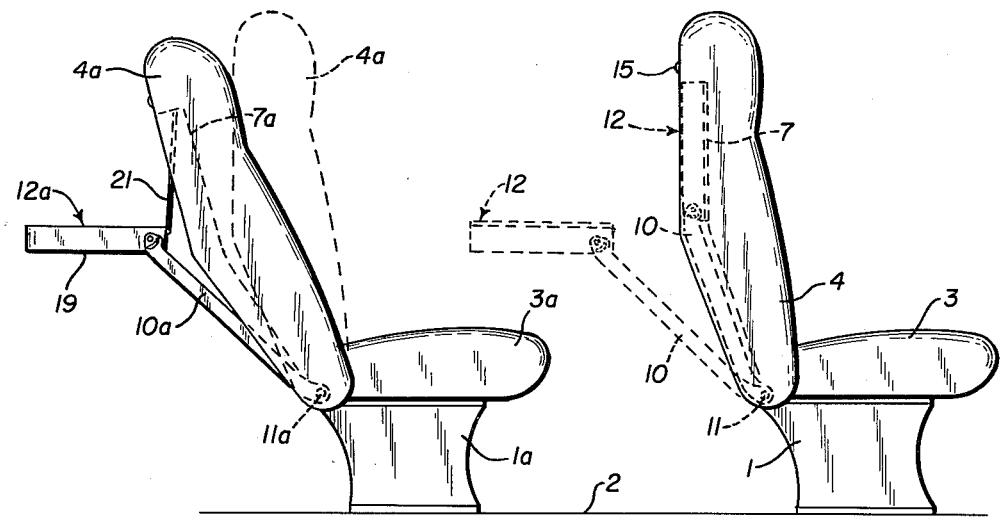
FIG. 1 is a schematic view of two passenger seats mounted in tandem arrangement illustrating the positioning of a container according to the invention in relation to the seat back in which it may be stored.
Figure 2:
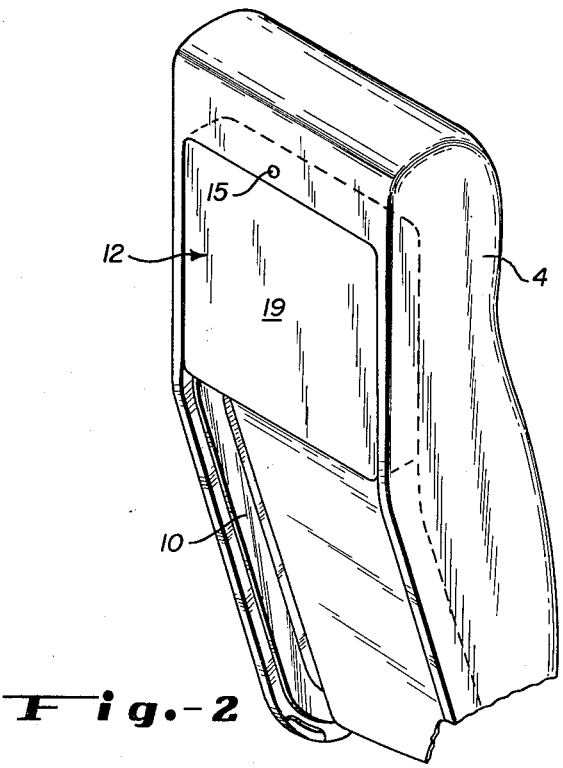
FIG. 2 is a perspective view of a seat back illustrating the storage container in stored position.

FIG. 1 illustrates a small section of a passenger vehicle in which only two of multiple seats are shown. In this present instance, two chairs satisfactorily illustrate the construction and operation of the particular invention. As is well known, such seats may be mounted side by side in pairs or threes or more, depending on the aircraft and a plurality of such sets are arranged in rows longitudinally of the vehicle. Such passenger seats normally have a reclining back, as indicated in the left hand seat and may have arm rests. The arm rests are not shown in this diagram for clarity, but it is to be understood that such arm rests may be used, where desired, and these will not hinder the operation of the invention.

A seat base or support 1 is mounted on a floor member 2 in a position to hold a seat cushion 3. A seat back 4 which is arranged to recline is pivotally secured to the rear portion of the support to provide for the comfort of the passenger in either sitting or reclining position. A similar seat support 1a is shown directly behind seat support 1, and similar parts are identified by the postscript "a". Thus seat 3a is mounted on support 1a and the back 4a is also pivotally arranged on the support. The rear portion of the back of the seat 4 is provided with a recess or cavity 7 which extends substantially the lateral extent of the seat back and substantially its length. A pair of arms 10 are pivotally mounted at 11 to the seat support 1 or to a lower portion of the seat back 4 or to the pivot 11 so as to be essentially unaffected by movement of the seat back 4 when in the extended position. In this way, the arms may be extended toward the passenger in the seat behind the particular arms, and movement of the seat back will not move the arms. The arms 10 are arranged to pivot about 11 from a passenger usable lowered position to a retracted position in the recess 7 in the seat back.

Container 12 is pivotally secured to the arms 10 in such a manner as to extend over the rear seat 3a in position for use by a passenger in the seat. The container is arranged to pivot from a supported horizontal position shown in dashed lines to a vertical position, and on pivotal movement of the arms 10 into storage position in the recess 7 in the seat back 4. A latch release 15 controls a latch mechanism, not shown, for holding the container in the recess 7. There are, obviously many types of latch arrangements for holding such a container in position in a recess, and details of such construction are not part of the present invention.

The seat 3a is illustrated with attached arms 10a in extended position supporting container 12a in position for the use of a passenger in a seat (not shown) behind seat 3a. This extended and usable position remains the same whether the seat is in reclining position, as shown in the solid lines, or in upright position, shown in the dashed lines. Thus, it is possible for a passenger in a seat to utilize the container 12 without hindrance by the seat back of the passenger in front.

The box or container 12 is pivotally mounted on the arms 10 by means of a pivot pin 15 secured to a pivot plate 16 which is integrally secured to the arms 10. An arcuate slot 17 cut in the latch plate 16 accommodates pin 18, which is secured to the container 12, for free movement in the slot 17. This limits pivotal movement of the box about the pivot pin 15 in both directions. In the position illustrated in FIG. 3, the container is in horizontal position for use by a passenger either as a flush top tray or desk, and in the position of FIG. 4 the container 12 is substantially vertical and pressure applied in the direction of the seat moves the container 12 and the arms into the recess 7. With the container in the seat in latched position it is out of the way of the passenger. As noted in FIG. 1, the container is offset laterally of the pivot pin 11 so that release of the latch 15 permits the container to fall by gravity from the recess into usable position for the passenger.

The container illustrated in FIG. 5 comprises a base member 20 which has a bottom 19 and upstanding walls forming a box-type container. The corners of the container are rounded to prevent injury of the passengers. A close fitting top 21 is secured to the base by a hinge system, as for example a piano hinge 22. In one highly useful form, the container is made of fiber glass which is light and strong, and metal reinforcing inserts, not shown, may be used to support the pins 15 and 18 in the container sides for added strength. It is preferable to provide a latch system 23, shown in FIG. 3, which may be a hook and eye latching or any other convenient latch to maintain the lid closed.

For the service of food, an insert 24, which may be of fiber glass or other plastic, having short, downwardly projecting walls 25 is arranged to fit in the container 20. The side walls 25 hold the insert above the bottom of the container 20, so that small, individual containers of food may be placed in openings 26 to 32 for holding the food containers in proper spacing in the insert.

The service of certain foods in individual containers or covered dishes is customary with airline companies, and the holes through the insert 24 are arranged to hold similar individual dishes. For example, the main course of the meal is placed in a container which is held in opening 32, the container being shaped to fit the rectangular opening. The beverage container may be held in opening 28, for example. Other individual containers are held in the openings 26, 27 and 28 as may be needed. Small containers may be held in the openings 30 and 31.

The individual food containers are of such a shape as to be held in the insert as it is put in or lifted out of the container 20. Further, such containers are provided with tight fitting lids or covers to prevent spilling. Thus containers having slightly outwardly sloped sidewalls are satisfactory for use with the insert. As will be explained below, it is important that the inserts are movable with the food containers intact and retained in the insert openings.

In using the device of the invention, an entirely new concept in the service of food is available for limited duration trips. For example, as more jet aircraft become available for commercial use, shorter flights are being utilized, that is, flights between cities which are not time-wise a great distance apart. With the device of the present invention at a stop immediately prior to the short, meal-time flight, the caterers could, with only a few personnel, lower and open all of the containers 12, place an insert filled with covered individual food dishes in the containers. The loaded containers are then closed and moved to the storage position in the seat back in front of the individual passenger. After boarding and being seated the passengers are able to eat at their convenience without waiting for the hostesses to serve the meal. Since all of the food containers are closed with lids or caps, there is no danger of spillage in the container. In this way even liquid foods and beverages may be stored in the container for use by the passenger at his convenience. It is, also, contemplated that solid food only may be stored in the containers, and as the passengers commence eating, the hostesses may provide the beverage for the meal.

Another distinct advantage of the system is the removal of the dirty dishes after the meal has been consumed by the individual passenger. With conventional service, the passenger must wait for the hostess to remove the dirty dishes after the completion of a meal. With applicants' device, however, the cover need merely be closed and locked to dispense with dishes. The container may then be used as a writing desk, tray for playing cards or the like, or it may be pushed back to its storage position out of the passenger's way. Thus service may be provided for all of the passengers at their convenience, and they may also dispose of the dirty dishes at the end of the meal, at their convenience without waiting for the hostesses. It is readily apparent that in flights of even less than an hour's duration all of the passengers on the plane, whether there are ten or a hundred, are fed at their convenience and the dishes disposed of without additional help which normally would be required for the service of food.

After a meal-time flight, with the device of the invention, on landing at the next destination the caterer need merely go through the aircraft lowering all of the containers, removing the inserts with the dirty dishes and if the next flight requires meals, a filled insert replaced in the container. Where the next flight does not require meals, the container may be maintained empty or advertising literature, information or the like placed in the container for the convenience of the passenger.

Obviously, the insert may be made to accommodate special containers, or the containers may be made a part of the insert. Also, the individual containers may be of a height approximately equal to the depth of container 20 so as to be held in position in the insert by the cover 21. In such cases the individual containers would be tightly held between the bottom 19 and the cover 21, which provides additional assurance against spillage. Also, the insert may be provided with a handle or at least manipulating holes so that the entire insert and individual food dishes may be placed in or withdrawn from the container with minimum effort and with facility to provide the caterers with a fast and easy way of filling or emptying the containers. Thus servicing of the aircraft at stops is greatly speeded and the amount of work of providing satisfactory service for the passengers is reduced with greater convenience and comfort for the passengers.

While the invention has been described by reference to specific details, there is no intent to limit the spirit or scope of the invention to the precise details nor to the particular mode of transportation with which it is described, for example, such a system would be highly useful in bus or train travel wherein the transportation companies may provide deluxe service for the passengers, as by serving sandwiches or snacks during trips.

What is desired to be claimed in United States Letters Patent is:

A tray and support means therefor for use with a reclining seat comprising a hollow box type container having opposite sides, ends and a top and bottom, pin means extending from the opposite ends thereof, elongated support arms having their upper ends pivotally connected to said pin means, other pin means secured to the lower end of said arms adapted to be attached to a seat so said arms may be pivoted with respect to the seat, the upper ends of said arms having an arcuate slot therein, stop pin means on the opposite ends of said tray extending into said slots for free movement therein, said slot means being disposed to limit movement of said tray from a horizontal position to a vertical position, and to position said tray in a substantially horizontal position when said stop pin means are disposed adjacent the upper end of said arcuate slot, and to position said tray in a substantially vertical position when said stop pin means are disposed adjacent the lower end of said arcuate slot.

References Cited in the file of this patent

UNITED STATES PATENTS

| | | |
|---|---|---|
| 688,798 | Steinbach | Dec. 10, 1901 |
| 1,336,776 | Drinkwater | Apr. 13, 1920 |
| 2,098,426 | McDonald | Nov. 9, 1937 |
| 2,132,279 | Wicknick et al. | Oct. 4, 1938 |
| 2,284,811 | Ferrelle | June 2, 1942 |
| 2,613,804 | Hughes | Oct. 14, 1952 |
| 2,619,395 | Kent | Nov. 25, 1952 |
| 2,924,372 | Kirkeby | Feb. 9, 1960 |

FOREIGN PATENTS

| | | |
|---|---|---|
| 1,209,207 | France | Feb. 29, 1960 |